No. 611,477. Patented Sept. 27, 1898.
G. N. GUTHRIE.
FRUIT JUICE EXTRACTOR.
(Application filed Apr. 2, 1898.)
(No Model.) 2 Sheets—Sheet 1.
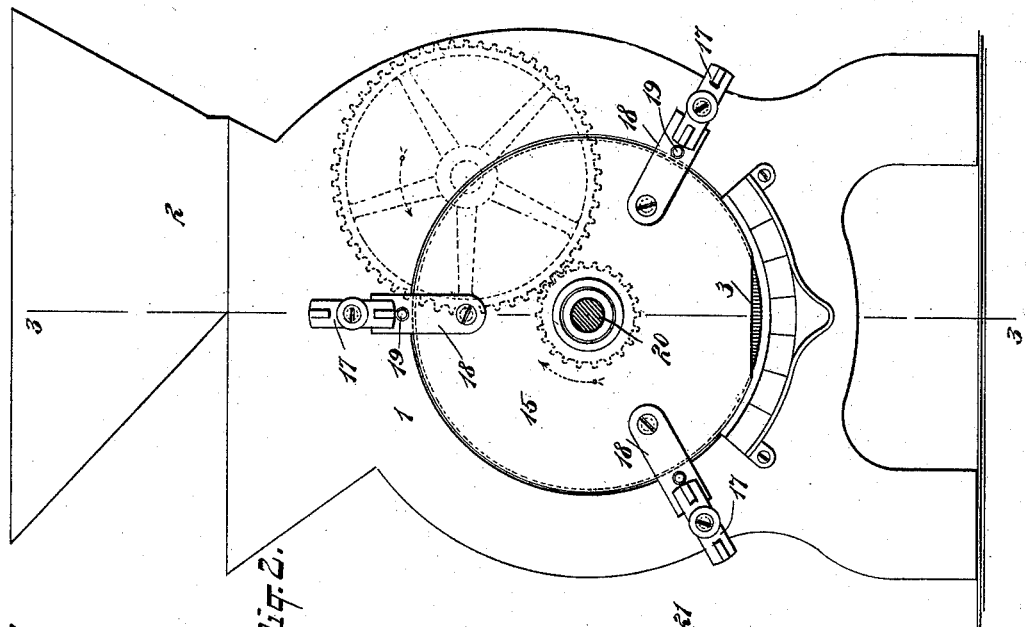
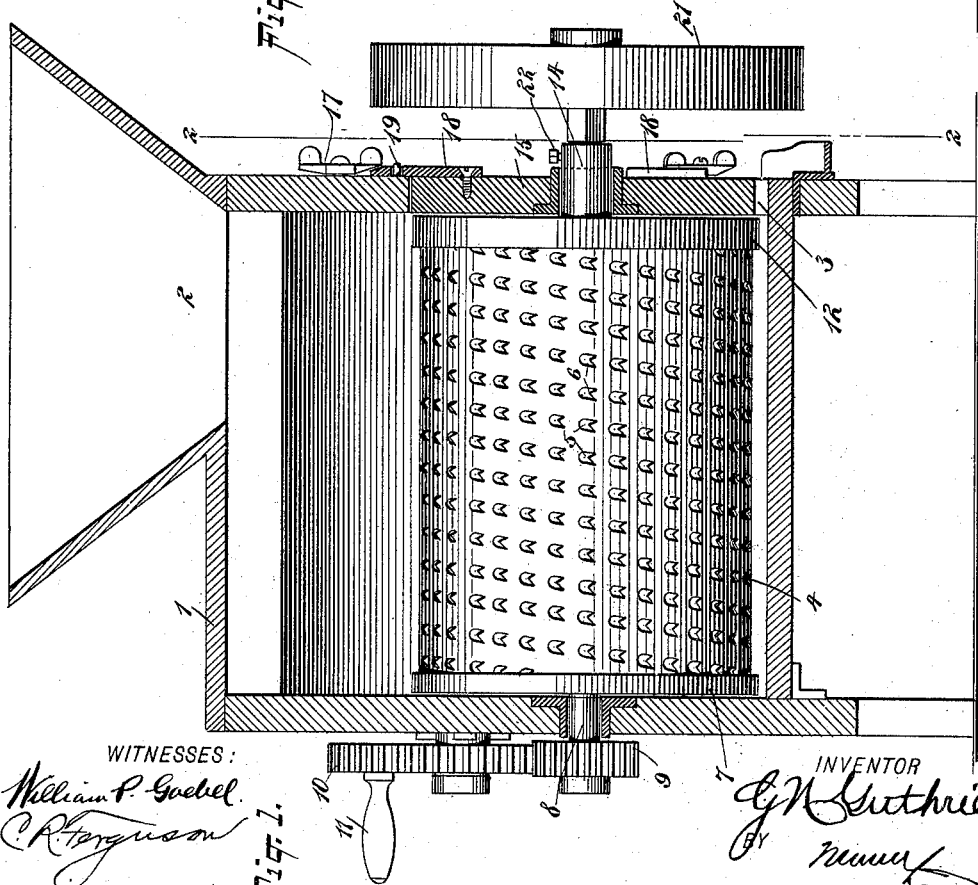

No. 611,477. Patented Sept. 27, 1898.
G. N. GUTHRIE.
FRUIT JUICE EXTRACTOR.
(Application filed Apr. 2, 1898.)
(No Model.)
2 Sheets—Sheet 2.
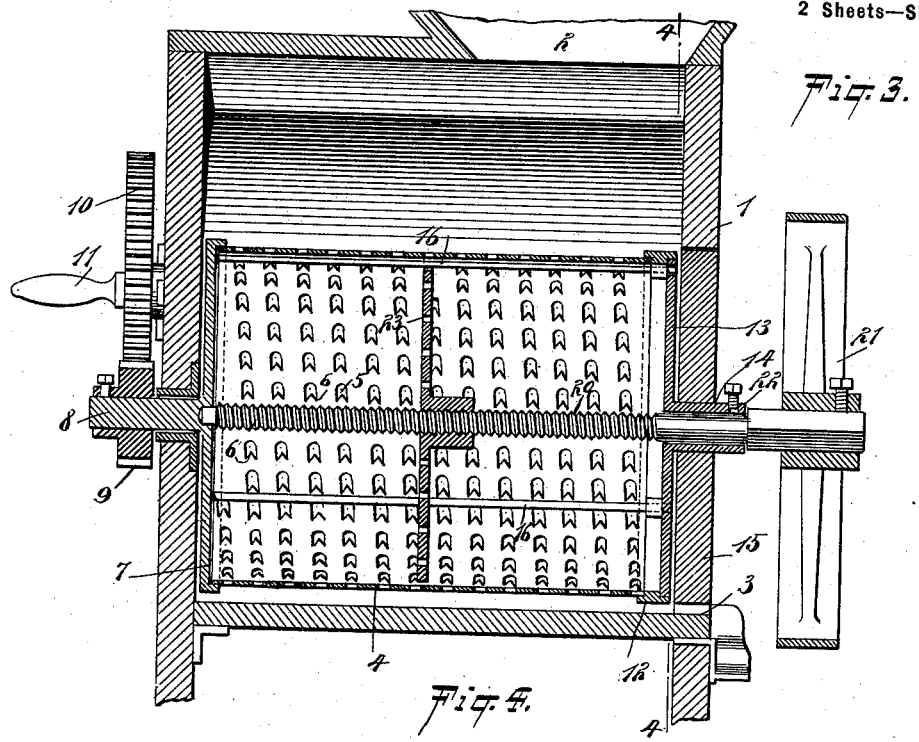
Fig. 3.
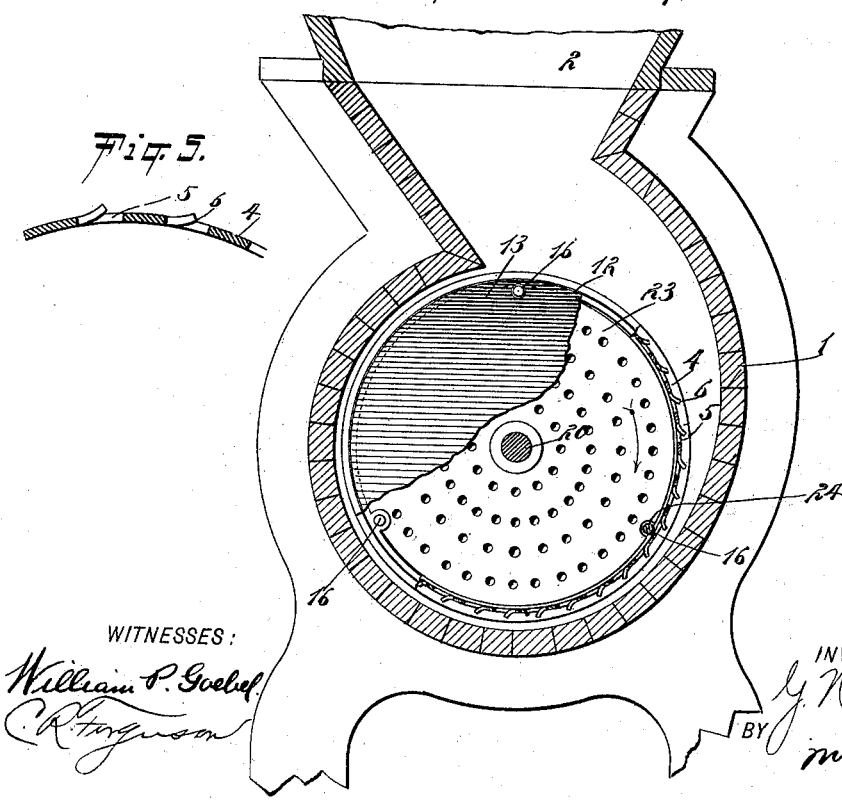
Fig. 4.
Fig. 5.
WITNESSES:
William P. Goebel
C. R. Ferguson
INVENTOR
G. N. Guthrie
BY
ATTORNEYS.

UNITED STATES PATENT OFFICE.

GEORGE NUCKOLS GUTHRIE, OF GALLATIN, TENNESSEE.

FRUIT-JUICE EXTRACTOR.

SPECIFICATION forming part of Letters Patent No. 611,477, dated September 27, 1898.

Application filed April 2, 1898. Serial No. 676,184. (No model.)

*To all whom it may concern:*

Be it known that I, GEORGE NUCKOLS GUTHRIE, of Gallatin, in the county of Sumner and State of Tennessee, have invented a new and Improved Fruit-Juice Extractor, of which the following is a full, clear, and exact description.

This invention relates to machines for extracting the juice from fruit—such, for instance, as from cider-apples or from grapes or berries—and it may be used for grinding tomatoes for catsup-making; and the object is to provide a simple and comparatively inexpensive machine in which the whole fruit may be reduced to a pulp or pomace and then pressed to extract the juice.

I will describe a fruit-juice extractor embodying my invention, and then point out the novel features in the appended claims.

Reference is to be had to the accompanying drawings, forming a part of this specification, in which similar characters of reference indicate corresponding parts in all the views.

Figure 1 is a vertical section of a fruit-juice extractor embodying my invention. Fig. 2 is an end elevation, partly in section, on the line 2 2 of Fig. 1. Fig. 3 is a section on the line 3 3 of Fig. 2. Fig. 4 is a section on the line 4 4 of Fig. 3, and Fig. 5 is a section of a portion of the reducing-cylinder.

Referring to the drawings, 1 designates a casing made of any suitable material and substantially cylindrical in form. This casing has a hopper 2 at its top, near one end, and it has an outlet 3 through one end for the discharge of the expressed juice.

Mounted to rotate in the casing is a reducing-cylinder 4, having a series of spirally-disposed openings 5, and on an end wall of each opening is an outwardly-extended tooth 6. The object in spirally arranging the openings and teeth is so that the apples or other fruit fed from the hopper onto one end of the cylinder will be carried along the cylinder and thoroughly reduced to pomace, the pomace of course falling through the openings into the cylinder. To one end of the cylinder 4 is affixed a head 7, having a trunnion 8 extended through a wall of the casing, and to which power is to be applied for turning the cylinder. As here shown, a pinion 9 is secured to the trunnion and meshes with a gear-wheel 10, having a crank-handle 11. To the other end of the cylinder is affixed a ring 12, in which is removably placed a head or disk 13, which has a tubular trunnion 14 extended outward through a removable end wall 15 of the casing. The head 7 and the ring 12 are held in connection with the cylinder by means of tie-rods 16, the ends of which are projected beyond the surface of the ring 12, so as to engage in holes in the head or disk 13 and prevent its turning. The removable end wall 15 is held in place by means of buttons 17, engaging with plates 18, extended outward from said end wall, and to prevent the end wall from turning pins 19 are extended from the casing to engage in holes in the plates 18.

A screw-shaft 20 extends centrally through the cylinder 4 and has a bearing at one end in the head 7 and at the other end in the tubular trunnion 14. To the outer end of the screw-shaft is attached a power-wheel 21, and while the cylinder is in operation to reduce the fruit to a pomace the screw-shaft is held from rotation relatively to the cylinder by means of a set-screw 22, engaging in a tapped hole in the trunnion 14 and impinging against the shaft. Arranged within the cylinder and adapted to move on the screw-shaft is a perforated presser plate or disk 23, provided with notches 24 at its edge, and through which the tie-rods 16 pass, thus preventing a rotation of the disk relatively to the cylinder.

In operation the fruit is to be placed in the hopper 2. Then upon rotating the cylinder the fruit will be reduced to a fine pulp or pomace and will pass through the openings 5 into the cylinder. At this time the presser-disk will be at the extreme end of the cylinder. After a sufficient quantity of pomace shall have been received in the cylinder the screw 22 is to be loosened from the screw-shaft. Then by rotating the screw-shaft the presser-disk will be moved forward and press out the juice, which will flow out through the openings 5 and the outlet 3. After expressing the juice the end wall 15 may be removed, after which the disk 13, the screw-shaft, and the presser-disk may be removed and the machine thoroughly cleaned.

A machine embodying my invention may be made of any desired size and will be found useful for household purposes when it is desired to make a small amount of fresh cider or the like.

Having thus described my invention, I claim as new and desire to secure by Letters Patent—

1. A fruit-juice extractor, comprising a casing, a perforated cylinder having cutters for reducing fruit to pomace and mounted to rotate in the casing, a screw-shaft extended through the cylinder, and a presser-plate in the cylinder adapted to be moved by the screw-shaft, substantially as specified.

2. A fruit-juice extractor, comprising a casing, a perforated cylinder having cutters spirally arranged for reducing fruit to pomace, a presser-plate in the cylinder, and means for moving the presser-plate in the cylinder, substantially as specified.

3. A fruit-juice extractor, comprising a casing having a hopper at one end, a perforated cylinder in the casing, cutting-teeth extended outward from the cylinder and spirally arranged and designed to reduce fruit to a pomace, a perforated presser-plate in the cylinder, and a screw-shaft for moving the presser-plate in the cylinder, substantially as specified.

4. A fruit-juice extractor, comprising a casing having a removable end wall, a perforated fruit-reducing cylinder in the casing, a head secured to one end of the cylinder, a ring secured to the other end of the cylinder, a disk removably secured to said ring and having a tubular trunnion, a screw-shaft having a bearing through said trunnion, and a presser-plate operated by the screw-shaft, substantially as specified.

5. A fruit-juice extractor, comprising a casing, a fruit-reducing cylinder mounted to rotate in the casing, a presser-plate movable in the cylinder and means for moving said plate, substantially as specified.

GEORGE NUCKOLS GUTHRIE.

Witnesses:
J. TOM DURHAM,
A. D. CHRISMAN.